United States Patent [19]

Hartwich et al.

[11] 3,818,201

[45] June 18, 1974

[54] METHOD AND SYSTEM ARRANGEMENT FOR MONITORING AND INDICATING PULSE TIMING FUNCTIONS WITH MEASURABLE TIME REFERENCE

[75] Inventors: Reinhard Hartwich, Boeblingen; Gerhard Kundel, Karlsruhe; Hans H. Lampe, Oberjesingen; Peter Rudolph, Schoenaich, all of Germany

[73] Assignee: International Business Machines Corporation, Armonk, N.Y.

[22] Filed: Nov. 16, 1972

[21] Appl. No.: 307,275

[30] Foreign Application Priority Data

Dec. 17, 1971 Germany............................ 2162837

[52] U.S. Cl... 235/151.31, 235/153 AC, 324/73 AT

[51] Int. Cl. .......................................... G06f 11/00

[58] Field of Search ................ 235/151.31, 153 AC; 324/73 R, 73 AT; 444/1

[56] References Cited

UNITED STATES PATENTS 3,351,910 11/1967 Miller et al. ............... 235/151.31 X

*Primary Examiner*—Felix D. Gruber
*Assistant Examiner*—R. Stephen Dildine, Jr.
*Attorney, Agent, or Firm*—Robert Leiber

[57] ABSTRACT

A multi-channel pulse monitoring and indicating system uses a programmed digital computer system to control sampling and display, in time measurable context, of multiple pulse timing functions of peripheral devices and/or service processors. The sampled functions are stored electronically and also visibly presented on a retentive CRT display unit associated with the computer system. A keyboard associated with the computer permits a service operator to interact with the program and select the service processor which is to be monitored and the time measurement parameters of the system; with selection prompting indications presented by the program to the operator via the display unit. An example is given of the time-referenced indication of feeding, punching, reading, printing and stacking functions of a record card processing unit.

12 Claims, 6 Drawing Figures

Figure 1:
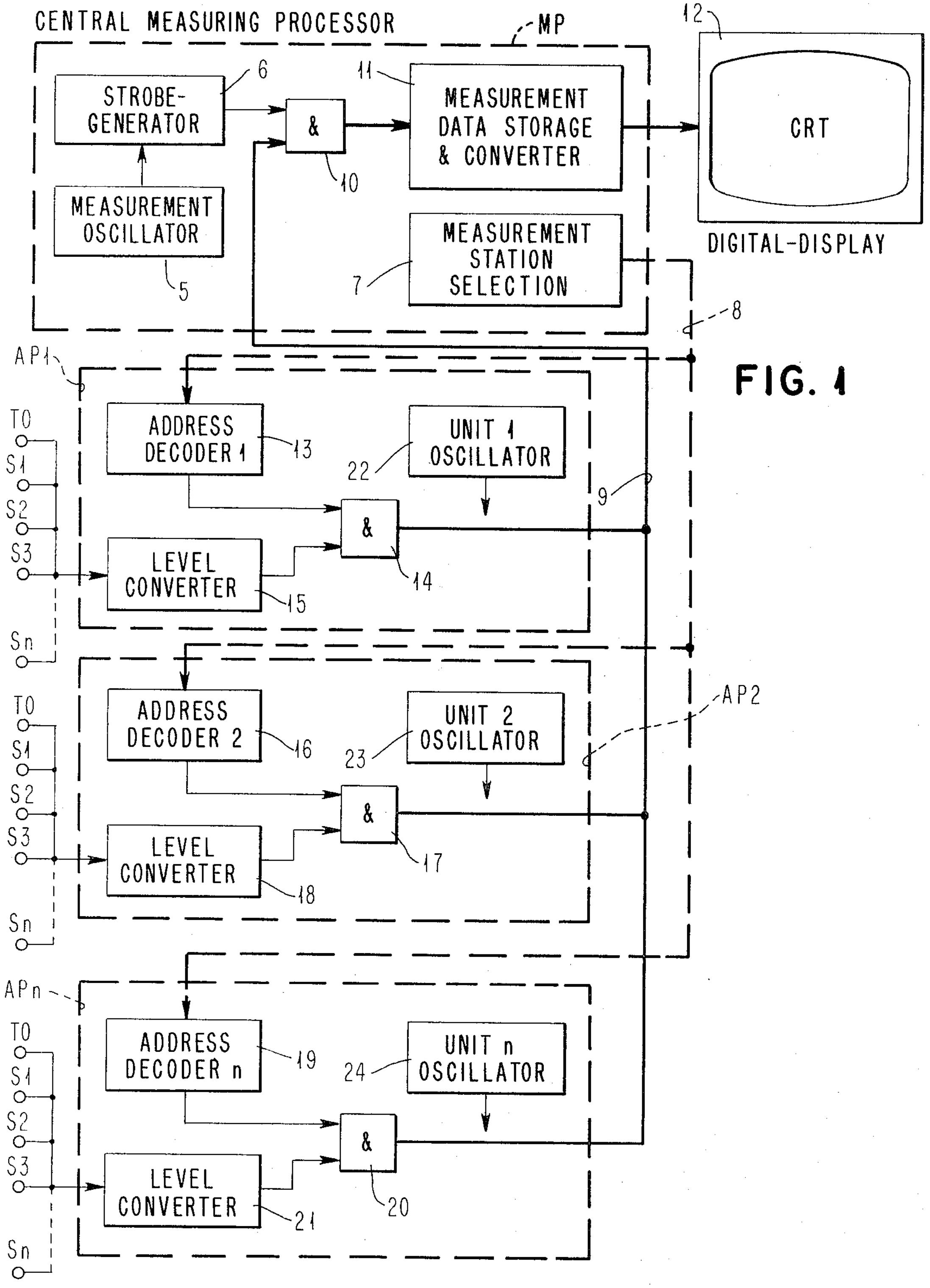

METHOD AND SYSTEM ARRANGEMENT FOR MONITORING AND INDICATING PULSE TIMING FUNCTIONS WITH MEASURABLE TIME REFERENCE

The invention relates to a multi-channel monitoring and indicating system for providing measurable indications of timed pulse functions of multiple devices. In particular the invention pertains to method and system arrangement for utilizing a display unit, a programmed digital computer and I/O channels of the computer to control central selection of input/output units or service processor units by a human operator and central monitoring and time scaled indication of plural timing pulse functions of the selected unit. This may be in addition or ancillary to other data processing functions carried out by the computer and these units.

Input-output devices, terminals and/or service processor units of a data processing system, and also individual assemblies or discrete sub-units within such units perform functions requiring precise time adjustment with respect to a common time reference. Thus, in a card processing unit the functions of the feeding, punching, reading, printing and stacking subassemblies must be adjusted to have properly coordinated timing relations. In many instances, these functions are controlled by electrical pulse signals which accordingly require precisely adjusted relative timing. When there are misadjustments or errors in the unit the timing of these control pulse signals will be off and observation of this allows diagnostic conclusions to be made concerning the error source so that the error may be simply corrected; for instance by readjustment of appropriate components. Conventionally, these signals have been monitored for adjustment by means of standard or multibeam oscilloscopes. This however involves considerable effort and skill on the part of the user to control selection and accurate reading of the time scale for the several relative measurements.

An object of the present invention is to provide a method and apparatus by which such time-based measurements can be made in a simple manner in order to facilitate testing and maintenance of the associated unit systems.

According to the present invention this is achieved by connection of each service processor or input-output unit via a respective address channel and a respective measure data channel, to the central measuring processor. Each service processor unit thereby has an associated predetermined address which can be designated for selection at the central processor. All relevant signal measurement points of the selected device are adapted for switched connection to the central measuring processor via the measure data channel. A pulse trigger signal supplied by the selected unit on a line of the measure data channel is utilized as a time reference. A leading or lagging edge transition of this trigger signal actuates the central measuring processor to being sampling, in predetermined intervals, all measure valued signals present presented on the measure data channel until the next change of state of the trigger signal. The momentarily sampled measure values are stored and continuously displayed on separate lines of the central display device associated with the individual measure values.

In one advantageous embodiment of the inventive process, the time basis of measurement relative to which the displayed measure values are sensed can be adjusted in stepped increments spanning a range of discrete time scales. Thus, it is possible to advantageously adapt the resolution characteristics of the display to the actual time durations of the measure value signals to be observed.

In another advantageous embodiment, a delayed sweep is utilized to permit the central display of the measure value signals to be shifted with respect to time by predetermined amounts relative to the selected reference edge transition of the trigger signal. Thus, it is possible to provide indication of out of measure values which occur out of the normal viewing range. Such sweep delay selection can be made in successive steps; e.g. to produce measure value viewing shifts of 40, 80 or 120 scale positions.

A further advantageous embodiment of the subject method as discolsed herein involves selective triggering initiation of the measure value sampling and indicating functions relative either to the positive slope (rise) or negative slope (fall) transition of the measure value signal which is selected as the time reference trigger signal. Thus, the measuring procss and time representation can be adapted advantageously to provide time-scaled indication of measure values occurring at arbitrary times, while the initial time reference invariably is a transition of one reference trigger signal.

Yet another very advantageous and useful feature of the inventive process is the capability of fixing the display indication either manually and asynchronously through external key access or automatically and synchronously conditional upon detection of predetermined coincidences of sampled measure value signals. In this manner, it is possible to freeze an interesting set of measure value indications on the display device for observation in an uncomplicated manner without time pressure.

According to another embodiment of the inventive process, it is possible to represent on the display the maximum deviations of the measure value signals sampled over a long period for evaluation and comparison with the measure values which are instantaneously being displayed.

An advantageous and suitable embodiment for carrying out the inventive process as outlined above utilizes a central measuring processor comprising: station selection circuit for establishing connection to the unit to be monitored; a measuring oscillator; a generator for the strobe (sampling) pulses; a storage and display translation facility for sampled measure data; and an AND circuit conditioned by the strobe pulses for sampling the measure value signals and transferring the samples to the storage and translation facility.

Another advantageous embodiment of the inventive arrangement for carrying out the subject process utilizes a retentive screen display device which can provide sustained display of information which is not changing. The display unit is preferably capable of displaying alphanumeric symbols in tabular column and row form. The use of such a screen device as an auxiliary element of the computer system permits the inventive process to be carried out as an ancillary function of the central system without additional display units being required.

According to another advantageous embodiment of the arrangement for carrying out the inventive process, each column on the screen unit has an associated strobe pulse to simplify the reading and evaluation of time measurements of displayed measure value images.

In accordance with another aspect of the invention, each service processor unit contains an address decoder and an AND circuit activated by the decoder for switching the respective measure value signals when the address decoder receives and decodes the uniquely associated address of the respective unit.

Another advantageous feature of the invention is the provision in each device of a voltage level limiter circuit which limits the voltage levels of the measure value signals to the levels of the respective unit's components, thereby eliminating the influence of spurious noise voltages superimposed on the measure value signals.

Another highly advantageous and useful feature of the inventive arrangement is the provision of a service oscillator in each service processor unit having its frequency tuned relative to the frequency of the measuring oscillator of the measuring processor with slight offset; for instance the service oscillator frequency may be made to differ from the measuring oscillator frequency by a known small integer multiple of one-thousandth of the measuring oscillator frequency. Surprisingly this arrangement permits measurable observation of time aspects of electronic measure value pulse functions having much shorter durations than the sampling pulses. Therefore, the inventive method can be used with this feature to permit measurement and control of time characteristics of extremely short duration signals.

In a useful and advantageous manner, the invention is further characterized in that the measuring processor is provided with a sequence control program for producing and maintaining the desired measurement and display indication functions. This program control feature is advantageously provided in the form of a changeably stored microprogram which is subject to modification by input of predetermined control data at the keyboard of the measuring processor.

Preferably the program is read into the service (i.e. program) storage of the measuring processor from tape cartridge or disk.

The method or arrangement according to the invention can be used to advantage for controlling, measuring and displaying with respect to time several signals of a device system comprising plural discretely addressable units. It is of no consequence here whether the signals of plural sub-assemblies of a single device or of plural distinct devices (e.g. discrete tape, punch, and print units) are concurrently monitored.

Figures 2, 2A:
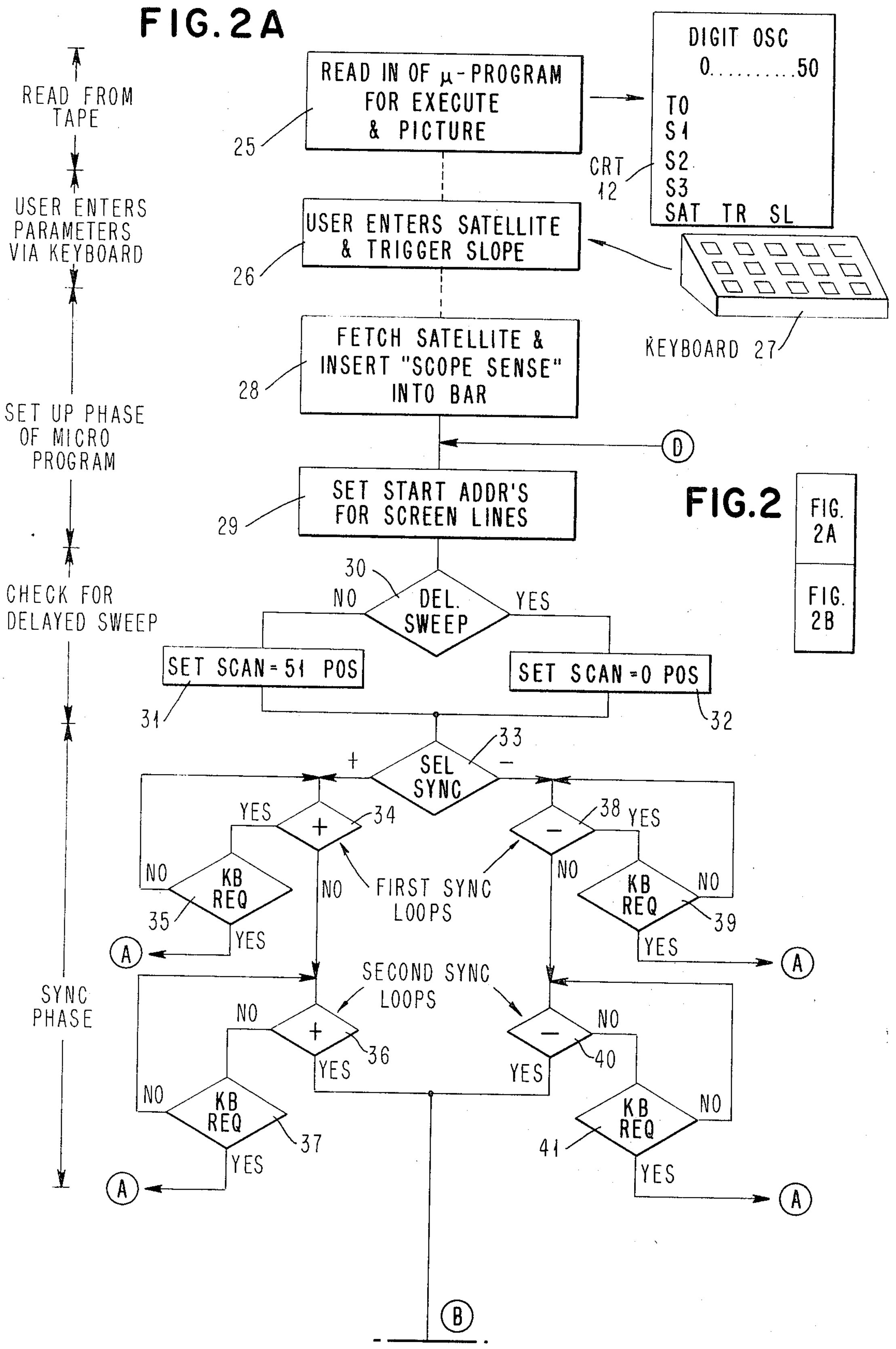
Figure 2B:
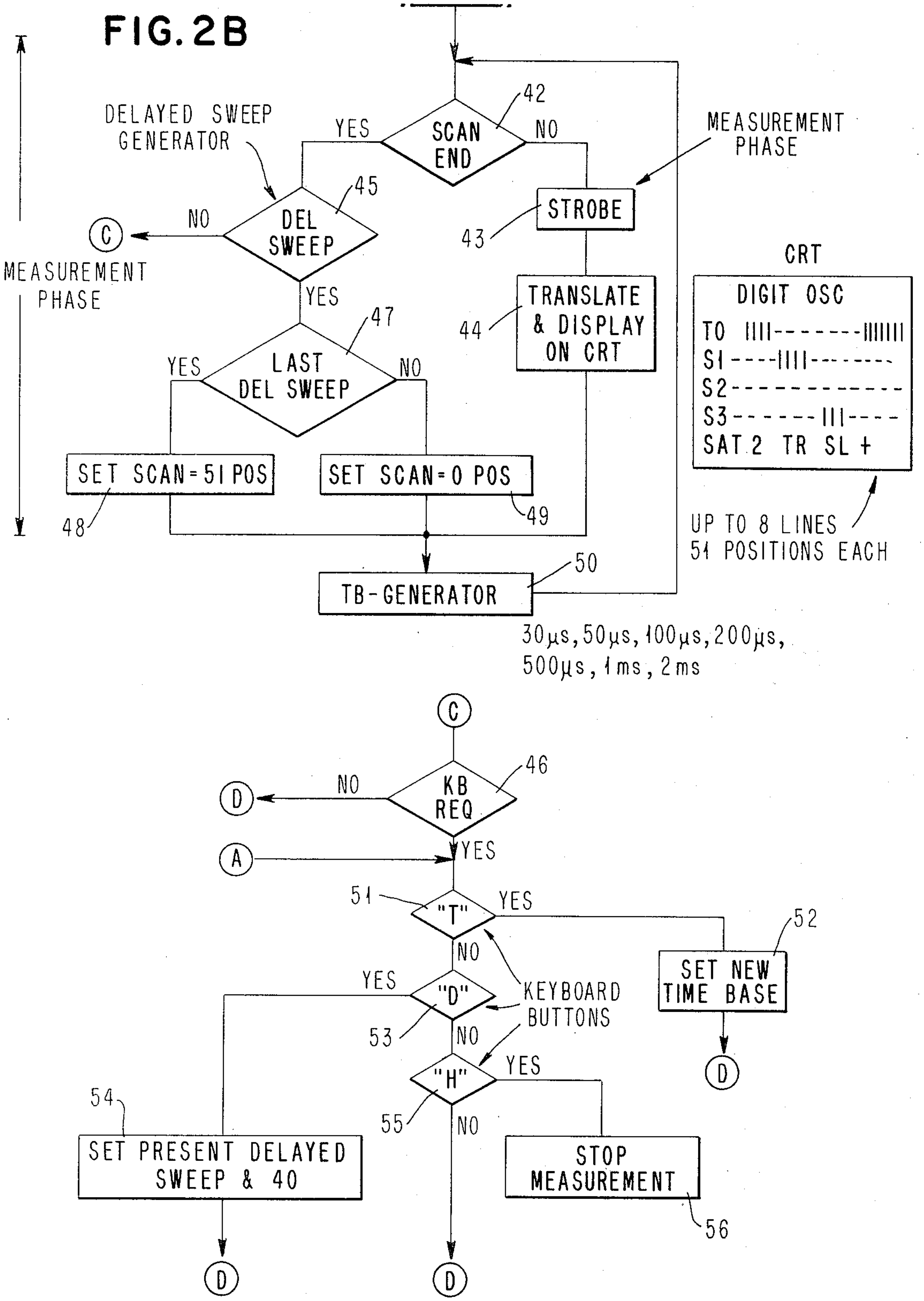
Figure 3:
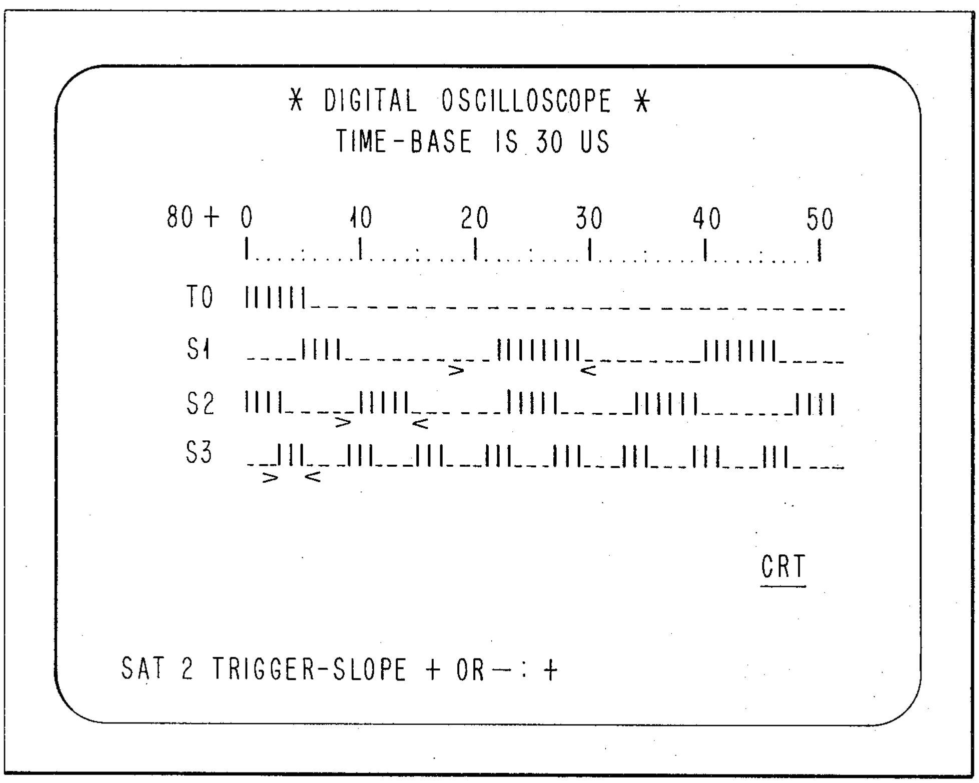

The inventive method and the structure and operation of the arrangement based thereon are described below with reference to accompanying figures of drawing in which:

FIG. 1 is a schematic of the arrangement of a central measuring processor and plural service processors equipped to operate in accordance with the inventive method;

FIG. 2 indicates the orientation of FIGS. 2A and 2B to provide a composite illustration in flow diagram form of the program control governing the sequence of operations of the measuring processor in respect to the subject indication and measurement process;

FIG. 3 provides an expanded view of a representative display image of measure values and other parameters formed and presented for viewing in accordance with the invention.

Figure 4:
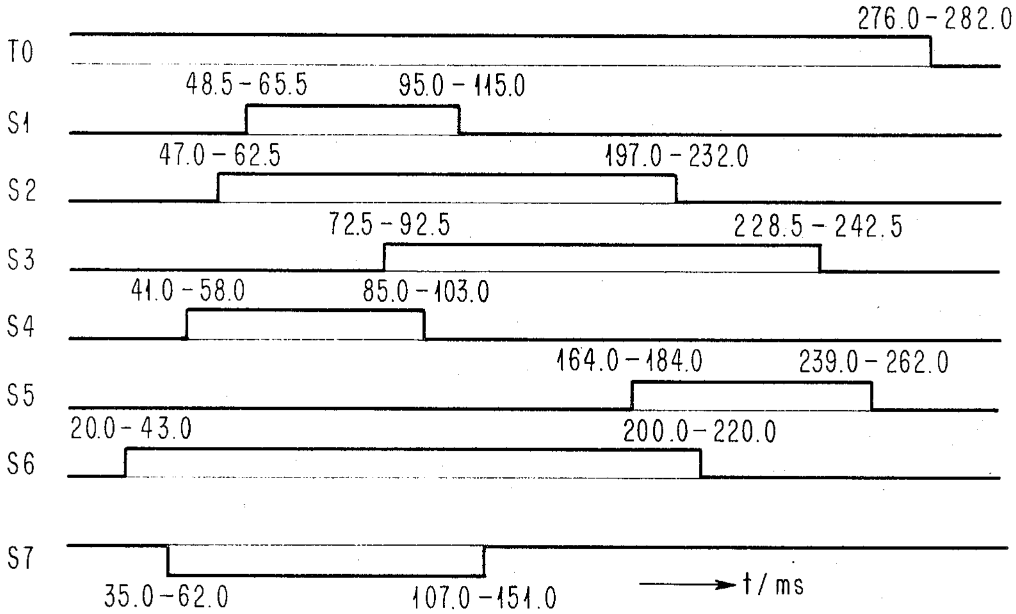

FIG. 4 illustrates typical waveforms of measure value signals which may be sampled and monitored by the subject system.

FIG. 1 illustrates a schematic representation of a central measuring processor MP subject to selective connection with three or more service processors AP1, AP2, . . . APn. Measuring processor MP contains a measuring oscillator 5 providing timing control to a strobe generator 6 supplying as output sampling pulses also denominated strobe pulses. In measuring processor MP, a measure position selection circuit 7 receives address representations which it presents via address line 8 to the service processors AP1, AP2, . . . APn. Each service processor has a distinct address to which it uniquely responds. Each service processor also has an output connection to measure data line 9 for completing a return signalling path to the measuring processor MP. Measure data line 9 connects within MP to AND circuit 10 conditioned by strobe pulses furnished by generator 6. In response to the strobe pulses, AND circuit 10 acts as a sampling switch coupling the signals on measure data line 9 to the measure data storage and translator unit 11. Unit 11 translates, the sampled measure value signals for display on screen CRT of display device 12.

Service processor AP1 contains address decoder 1 indicated by reference numeral 13 which decodes addresses received from measuring point selection circuit 7 via address channel 8. When the address is the one assigned to AP1, the output of the decoder is conditioned to enable AND circuit 14 to transfer the measure value signals T0, Sl, . . . Sn received via voltage level limiter circuit 15. The transferred signals are conveyed to AND circuit 10 of MP, via the measure data channel 9 for processing.

Similarly, service processor AP2 contains address decoder 2, indicated by reference numeral 16, which is responsive to the particular address associated with AP2 to condition AND circuit 17 to transfer the measure value representations T0, Sl, . . . Sn of monitored points of AP2 from level limiter 18 to MP.

Likewise, each of the service processors AP3, . . . , APn contain respective address decoders indicated by numeral 19 in APn for controlling respective AND circuits indicated by numeral 20 in APn to transfer outputs of respective voltage limiter circuits indicated by numeral 21 in APn to MP; the transferred outputs constituting representations of respective measure values T0, Sl, . . . Sn. Each service processor contains a respective service oscillator — indicated at 22 in AP1, 23 in AP2, 24 in APn — the function and importance of which in respect to the invention will be explained below.

The service processors AP1 to APn can be control units for individual devices in a computer system, for instance for a tape unit, a punch, a printer or a disc unit. They can however also be control units within an electronic device consisting of discretely addressable units. Such service processors which are available for instance in the form of circuit cards may be provided with contacts connecting to sources of the representations for the measure value functions T0, Sl, . . . Sn. The measure value signal representations can be translated with suitable timing to these contacts either by permanent wiring connections or through connection circuits subject to selective operation. This will depend on the particular device configuration and the measurement objective.

The voltage level limiters 15, 18, 21 are preferably configured so that measure values T0, Sl, . . . Sn are limited to voltage levels corresponding to the signal levels of the circuits and components of respective service processors. In this manner, spurious noise voltages due to external influences are eliminated and true measure value representations of respective processors are passed on via AND circuits 14, 17, 20 to AND circuit 10 in MP.

The development control and representation control for the measuring operation will be described with reference to FIGS. 2A and 2B. It turns out to be of particular advantage to have these control functions performed by a microprogram which can be modified by inputs from a keyboard. The central measuring processor MP and the display unit connected thereto have an associated input keyboard 27 shown in FIG. 2A. FIGS. 2A and 2B arranged as in FIG. 2, represent the program flowchart program.

Initially, the program is read in from a tape or disc so as to make an initial background image appear on the CRT screen after the execution program has been read into a service storage of the central measuring processor MP. This service storage is not shown in FIG. 1. On the screen, there appears the initial background image shown at the top right in FIG. 2A the purpose of which is explained in reference to FIG. 3 below. The function of reading in the microprogram for producing the initial background image is indicated functionally by the reference numeral 25 in FIG. 2A. The image SAT appearing on the bottom row of screen CRT display unit 12 requests the user to enter the address of the service processor, also called satellite processor, which is to be monitored. As indicated at 26 in FIG. 2A, the user selects the desired address (e.g. SAT 2 as shown in FIG. 2B) and a positive or negative trigger slope (transition) function TR SL (e.g. TR SL + as shown in FIG. 2B) which establishes the reference for time measurement and indication relative to a transitional edge of the trigger pulse T0. These selections by the viewer are made via the keyboard 27 (FIG. 2A).

In the next set-up stage of the microprogram, indicated at 28 in FIG. 2A, connections are established between the central measuring processor MP and the addressed service processor. Next, as indicated at 29, an initial address for the display screen lines is established by the program. The program then branches conditionally at 30 according to whether a delayed sweep is or is not to be used in the display. If the sweep is not to be delayed the program branches via NO line (N) to operaton stage 31 (SET SCAN) where the sweep of the display is set to the undelayed position corresponding to the scanning of the first 51 measure value samples immediately following the trigger pulse transition. If the yes leg (Y) of branch 30 is taken the SET SCAN function is set to position 0 at 32, in effect delaying the sweep scan by holding it at position 0.

The program then enters one of two synchronization loops, via branch 33, in which it waits for the occurrence of the positive or negative trigger signal slope change (transition) in accordance with selection made earlier at 26. In the positive branch, a further branch 34 is conditioned upon the currently sampled level of the trigger signal. If this is positive, the program branches to keyboard request (KB REQ) sensing branch point 35. At this point, instructions entered through the keyboard are sensed. If a keyboard instruction is pending, the program branches via the path indicated by encircled A to an instruction execution subroutine 51–55 (FIG. 2B) thereafter either returning via the re-entry path indicated by encircled D to stage 29 of the program or terminating at 56 depending on branches taken in the subroutine. If there is no pending keyboard instruction at branch 35, the program reenters the synchronization loop via the N exit line of branch 35.

If the polarity of the trigger signal when next sampled has changed from + to − the program exits from synchronization loop 34,35 via N line of branch 34 and enters another synchronization loop 36,37. The program cycles in this loop so long as the trigger signal is negative and no keyboard instruction is sensed at branch point 37. If a keyboard instruction is sensed at 37, the program branches via A to instruction execution subroutine 51–55 mentioned above, either returning to step 29 via D or stopping. If there are no pending keyboard instructions the program remains in the loop reentering branch point 36. This is repeated so long as the trigger signal remains negative.

When the sampled trigger signal changes from − to +, the program branches, via Y exit line of branch 36 and the path indicated by encircled B to the measuring stage of the program shown in FIG. 2B.

The program path taken for negative trigger slope selection at the negative exit of branch 33 is structured similarly to the path taken at the positive exit of branch 33 and includes a first synchronization loop 38,39 and a second synchronization loop 40,41; with branches for keyboard instruction execution at 39 and 41 corresponding respectively to branches 35 and 37 explained above and with ultimate exit to path B.

The measuring phase of the program (FIG. 2B) begins with a strobe end testing branch 42. If the strobe end condition is not met, the program branches to phase 43 in which strobe generator 6 (FIG. 1) is operated to generate the strobe pulses for sampling the measure values through AND circuit 10 (FIG. 1) into the measure data storage and translator unit 11 (FIG. 1) for storage and translation into displayable format for presentation on the screen CRT.

If the strobe end condition is met at branch point 42 the program takes branch 45 testing for delayed sweep condition. If there is no delayed sweep condition, the program branches via exit point C to the entrance of the keyboard sensing routine 51–55 at branch point 46. If there is no keyboard instruction, the program exits at branch point 46 via the path indicated by encircled D to stage 29 (FIG. 2A) from which it proceeds as explained above.

If however a delayed sweep condition is found at branch point 45, the program tests at 47 for a last delayed sweep condition. If the last delayed sweep condition is met, the program performs operation 48 setting the strobe position to 51. This corresponds to the setting of 51 column indicating positions as explained in reference to stage 31 of FIG. 2A. If a last delayed sweep condition is not found at branch 47, the strobe position is set to 0 at operation stage 49. After operation stage 48 or 49, the program advances to operation stage 50 where it establishes the time scale of the strobe pulses produced by generator 6 of FIG. 1 and thereby determines the intervals in which the measure values are sampled into the measure data store 11. In the disclosed embodiment, the time base generator is equipped to generate strobe pulses at intervals of 30 microseconds, 50 microseconds, 100 microseconds, 200 microseconds, 500 microseconds, 1 millisecond or 2 milliseconds. This time spacing provides sufficient flexibility in particular for measuring pulses of input-/output devices of a computer system.

At the right-hand side of FIG. 2B, the screen image of the digital oscilloscope is again indicated schematically. It shows the representations of four measure values to be sampled T0, S1, S2, S3, the address of the selected service processor (SAT 2) and the selected positive trigger slope function (TR SL +).

If the program finds that there is no delayed sweep at branch 45, it takes path C to branch 46. If a keyboard instruction is pending at this time, the program enters the above-mentioned instruction interpretation routine 51–55 where if key T has been operated, the program branches from 51 to operation 52 establishing a new time base and then returns via D to the initial stage 29 (FIG. 2A). At a branch point 51 key T has not been operated, the program takes branch 53 to test whether key D has been operated. If so, the instantaneously available delayed sweep condition is increased at operation stage 54, e.g. by 40 scale position units, and the program returns to stage 29 via path D.

If at stage 53 the program finds that key D has not been operated, it branches at 55 on the condition of key H. If key H has been operated, the program stops at 56 and the image appearing on the screen at that moment is frozen. If key H has not been operated, the program returns to stage 29 via path D.

The operation of the measuring process in accordance with the invention is now reviewed as a whole. By predetermined input via keyboard 27 (stage 25 FIG. 2A) the program is loaded into the service storage of the central measuring processor MP from a tape or disc. The image "digital oscilloscope" is formed on the screen CRT. The bottom row of this image (reference FIG. 3) prompts the viewer to key in the address of the service processor or satellite which is to be selected for measuring and the desired trigger slope + or −. As indicated in the example of FIG. 3, address 2 designating service processor AP2 and positive trigger slope, may be selected. In response to the address (received via 8, FIG. 1) decoder 16 of AP2 enables AND circuit 17 of AP2 to transfer the output of voltage level limiter 18 representing the measure value signals T0, Sl, . . . , SN in AP2. The transferred signals are carried by measure data line 9 to AND circuit 10 of measuring processor MP.

Upon completion of the address and measure value connections between AP2 and MP the actual measuring process is started by operation of a key on keyboard 27. The control program then idles through the synchronization loops waiting for the occurrence of the selected slope change in the trigger signal of the addressed control unit. Upon detection of this slope change AND circuit 10 (FIG. 1) is enabled for short periods of time in equal intervals, by means of the strobe pulses supplied by the strobe generator 6, so that all measure values of AP2 input to AND circuit 10 are sampled momentarily into the measure data storage and translation unit 11. The stored sampled values are translated by the unit 11 into the appropriate form for display on the screen CRT of the display device 12 in the assigned rows. Each individual strobe pulse coincides with the tracing of an associated measure value column position on the screen. Thus the writing of measure value indications on the CRT screen is controlled by the basic sampling pulses.

As each row tracing process is completed (i.e., in the present example after 51 column points have been traced) the control program idles in the synchronization loop waiting for occurrence of the next triggering slope change in the selected direction. In the meantime however, the display of the information previously traced is sustained because a screen device with an associated storage means or retention property is used. The data stored in the measure data storage and translator unit 11 for all column positions of the previously scanned display row are therefore retained until occurrence of the next trigger signal slope transition of selected polarity. Thus, stable image is formed between occurrences of row scan trigger slope transitions which allows for stable display of very slowly repeated sampling processes.

The time scale for the measuring process, i.e., the intervals between strobe pulses, can be varied in discrete steps. The time base generator can generate the strobe pulses in intervals of 30 microseconds, 50 microseconds, 100 microseconds, 200 microseconds, 500 microseconds, 1 millisecond and 2 milliseconds. The time scale is selected by repeated operation of key T on the keyboard at stage 52 of the control program (FIG. 2B). With each operation of key T the time scale is incrementally changed to the next larger interval.

It is also possible to shift the display on the screen, i.e., by a delayed sweep. With each operation of key D on keyboard 27 (sensed at stage 54 (FIG. 2B) of the control program) the displayable sweep starting phase is incrementally shifted by 40 scale positions relative to the trigger signal transition. Thus sampled values can be displayed which would otherwise fall outside of the viewing range of the screen.

To facilitate observation and measurement, the time base and delayed sweep selections are indicated on the display (e.g. in FIG. 3, "30" microseconds and "80" delay scale units, respectively).

When particular measurements are to be considered for long periods of time spanning several cycles of the sampling process, there are two ways of preserving the display; i.e., for freezing the image on the screen. One way is by asynchronous manual operation of key H sensed at stages 55 and 56 of the control program (FIG. 2B). The other way is to provide time synchronous storage of measure value signals for comparison with instantaneously sampled measure value signals; with display freezing control conditioned upon detection of predetermined comparison coincidences. For control purposes, e.g. for signals which occur only once, the signal to control display retention may be obtained from the trigger signal function T0 after a complete frame of measure value sampling.

The highest resolution for sampling measure value signals in the present embodiment is achieved with the strobe pulse set to recur at intervals of 30 microseconds. This resolution is entirely sufficient for measuring input/output signals. As explained below, it is however also possible with this resolution to measure and display electronic signal functions having durations considerably shorter than 30 microseconds. An effective resolution of up to 25 nanoseconds can be achieved without difficulty.

The operation of the inventive process and of the inventive arrangement will be described in detail below in connection with a functional specification. After the control program has been transferred from tape or disc into the service storage of the central measuring processor MP the background image, as shown in FIG. 2A, top right, appears on the screen. The user then enters the address of the service processor which he desires to select and also the desired trigger slope, as indicated at 26 in the control sequence (FIG. 2A). Connection of the points to be measured to contact pins T0, Sl, . . . Sn of the individual service processors can be made prior to the start of the measuring process by hard wiring or during operation by logical gating. The control program is started by the operation of a predetermined input or enter key on keyboard 27 sensed during stage 28 of the operational sequence (FIG. 2A).

The control program transfers the selected address into the measure point selection circuit 7 which places the desired address representation on the address line 8. In the address decoders of the individual service processors Ap1–APn the address on line 8 is decoded, with the decoder of the particularly addressed unit responding to couple the associated measure value signals via data channel 9 to AND circuit 10 of MP.

The control program next determines the storage addresses for the screen measuring rows and also, by delayed sweep selection, the relative positional shifts of the rows. After this setting phase of the program, upon completing the check for delayed sweep selection, all parameters requisite to the measuring process are established.

The control program then waits in the synchronization loops for occurrence of the selected trigger signal transition. The synchronization loops comprise separate paths for positive and negative slope changes as previously discussed. If a positive slope change has been selected and if the trigger signal has positive level while the program is in the first synchronization loop, the program remains idling in that loop exiting only if instructions are received from the keyboard to perform the associated operation and return via 29. When the trigger signal level is tested (branch 34) and found to be negative the program enters the second synchronization loop exiting only when the required slope change from negative to positive is detected. The synchronization loops for negative slope selection operates similarly.

Depending upon the selected delayed sweep, the program next branches either to the measuring loop 43,44,50 or to the delayed sweep waiting loop 45,47,48 (or 49),50. In measuring loop stage 50, the strobe pulses exactly adjusted with respect to time are generated at the intervals of the selected time base and sample the measure value signals continuously applied to AND circuit 10 of the central measuring processor MP into a latching register. In this manner, the sampled signals are staticized for parallel transfer to the measure data storage unit 11. At the same time, the samples are applied to measure data translator 11 which traces the associated image of the staticized signals on the screen via independent circuits. Independently of the read-in and required time base, the correct interval for the strobe pulses is calculated and set in the time base generator 50.

If a delayed sweep is to be performed, branch 45 is taken bypassing the measuring loop. At stage 50, the time base generator counts the required number of sampling positions to the termination of the delay, thereafter switching precisely to the actual measuring phase. After a complete measuring process, i.e., tracing of 51 symbols in each measuring row on the screen, the program branches via path C to sense and conditionally execute any pending keyboard instructions such as Stop Measurement, New Time Base or Delayed Sweep.

The selection of time base and delayed sweep is performed in accordance with a rotation principle, i.e., each key operation increases the selected function to the next higher value or to the lowest value if the highest value was previously selected. If a measuring process is interrupted or a new process is started the control program invariably starts with the smallest time base and with undelayed sweep. Thus, reading errors are avoided which can occur when transitional intervals of measure signals coincide with the sampling interval and cannot be represented correctly.

When the image on the screen is to be frozen, i.e., when the oscilloscope is to be used quasi as a storage oscilloscope, repetition of the writing process is inhibited either by external control (i.e., by operation of key H) or by internal control conditioned upon the trigger signal transition or other coincidence of measure values.

The high resolution for measuring and display of so-called electronic signals can be achieved by establishing slightly offset tuning between the measuring oscillator 5 in measuring processor MP and the service oscillator (22,23,24) in the monitored service processor AP. The service oscillator frequency is set to a frequency slightly higher than the measuring oscillator frequency by a known integral multiple of one-thousandth of the measuring oscillator frequency. As the service oscillator controls the timing in the corresponding service processor, the electronic signal when sampled with the much lower frequency of the strobe pulses, appears to be sampled at small intervals corresponding to the phase drift of the tuning offset. Thus the process to be measured is effectively shifted by the amount of the tuning offset phase drift between successive sampling intervals. Figuratively, this can be viewed as a stroboscopic effect. It also unexpectedly permits sampling of signals which are much shorter in duration than the strobe pulses.

FIG. 3 represents the typical digital oscilloscope image displayed on screen CRT of display device 12. Under the legend "digital oscilloscope" the next row contains the indication of the time base for strobing, i.e., the intervals between strobe pulses of generator 6 (30 microseconds in the illustration). By operation of key T this time base can be increased in steps to larger values in the range indicated in FIG. 2B. The next row indicates the scale divisions which in the illustration consists of 51 divisions numbered 0–50 referenced to a delayed sweep of 80 scale positions. The following row contains the indication for and representation of the sampled trigger signal T0. The successive slope changes of this signal in the selected sense start the strobing and display tracing of the other signals S1, S2 and S3 which are displayed in rows below the T0 display. In the bottom row of the screen SAT 2 refers to the selected satellite or service processor AP2. The trigger slope reference which can be positive or negative is indicated in the illustration example to be positive; i.e., the sampling reference is the rising edge transition of T0. The address 2 of SAT 2 does not appear during the initial set-up phase in which the operator is prompted to key in the desired address by appearance of a prompting pointer indication on the screen at the appropriate time. Similarly, he is prompted to select a positive or negative trigger transition reference thereafter indicated in the last position of this row.

Often it is useful to display on the screen boundary conditions of an extended measuring process. For this purpose it is possible to indicate boundary value positions by bracket symbols (>,<) pointing towards the respective earliest rise transition and latest fall transition of the pulse, in the row beneath the associated measure value; as indicated beneath particular sections of the representations of S1, S2, and S3 in FIG. 3. It is thus possible to determine, and both to observe and evaluate, whether a displayed function has exceeded for a long period its due measure. Furthermore, the timing of momentarily existing and displayed measure values can be compared thereby to previous measure values.

As a screen device it is suitable to use the display device normally associated with a computer system which can display alphanumeric symbols. The representations of the sampled pulses on the screen can be provided by horizontal dashes for 0 values and vertical strokes for 1 values. Although this may be somewhat unusual for pulse representation, it is very practical and after an initial period of accommodation it is quite acceptable for practical usage without further difficulty because in most instances the object of the display is to indicate whether or not a pulse is present and not to indicate the absolute magnitude of the pulse. Additionally, only the leading edges and the trailing edges of the pulses and the relative timing of the displayed signals with respect to each other are important. These relations can easily be distinguished by means of the simple illustrated form of representation.

On the basis of FIG. 4, we next describe the formation of a pulse display representing sampled functions of a multi-function card processing unit in which record cards may be moved, read, punched, printed and stacked. In this unit, there can be up to five cards simultaneously. Signal T0 whose positive slope (leading edge on rise) is used as the trigger signal is an electromagnetically generated control signal for controlling the levels, coupling and roller movements required for moving the cards. S1–S7 are signals originating from photocells at the various stations subject to interruption of the light receiving condition upon passage of a card relative to the respective station. The leading edge of the pulse shows when the card leaves the station. The trailing edge of the pulse indicates the entrance of the next card into the respective station. The pulse length then represents the spacing interval between successive cards.

Pulses S1–S7 should appear within predetermined periods the variation (i.e., the tolerance range) of which is indicated on the display numerically (in milliseconds) at leading and trailing edges of the pulses.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for monitoring and indicating test conditions of multiple test points in service processors connectible to a main processor comprising:

a measuring oscillator in the main processor; a strobe pulse generation unit in the main processor coupled to the measuring oscillator for generating strobe pulses; a measure data storage and translation unit; a gating circuit operated by said strobe pulses to sample measure value data into said storage and translator unit; and means for displaying the sampled measure values in a time measurable context upon the occurrence of each sensing pulse.

2. An arrangement according to claim 1, in which the display means comprises a cathode ray tube with an image retention feature subject to affording continuous display of the desired image.

3. An arrangement according to claim 2 in which the cathode ray tube unit and the controls of the measuring processor are organized into an alphanumeric display medium for displaying measuring and identifying information in columns and rows, the rows defining the lines for indicating individual measure value functions and the columns indicating time positions of discrete measure value sample indications.

4. An arrangement according to claim 3 in which said columns are scanned for writing new measure value information in synchronism with said strobe pulses.

5. An arrangement according to claim 1, including address channel and measure value channel connections between the service processors and the measuring processor, in which each service processor includes an address decoder and measure value output gating network coupled between the address channel and measure value channel and responsive to decoding of distinct address signals uniquely associated with the respective service processor to transfer the respective measure value function signals to the measuring processor via the measure value channel.

6. An arrangement according to claim 5 in which each service processor unit includes a voltage limiter network for limiting the voltage of measure value signals transferred to the measuring processor in order to eliminate the effects of spurious fluctuations in said signals and the external ambient.

7. An arrangement according to claim 5 in which each service processor includes a service oscillator tuned to a frequency which differs from the measuring oscillator frequency by a multiple of a predetermined small fraction of the measuring oscillator frequency whereby the two oscillators have a predetermined small phase drift relative to each other.

8. An arrangement according to claim 7 in which the frequency offset of the service oscillators is utilized to provide time measurable indication of discrete samples of measure value signals having durations much shorter than the strobe pulses.

9. Apparatus according to claim 1 in which the measuring processor is programmed to control and maintain the sampling sequence and the display function.

10. Apparatus according to claim 9 in which the program is provided in the form of a microprogram.

11. Apparatus according to claim 9 in which the program is changeably stored in the measuring processor and is read into the program store of the measuring processor from a tape cartridge or disc.

12. Apparatus according to claim 9 in which the program is arranged to control the monitoring, sampling and time measurable display of plural test points in each of a plurality of discretely addressable service processor units.

* * * * *